March 2, 1965   H. J. MEEK   3,171,381
HATCH COVER ASSEMBLY
Filed Jan. 15, 1963
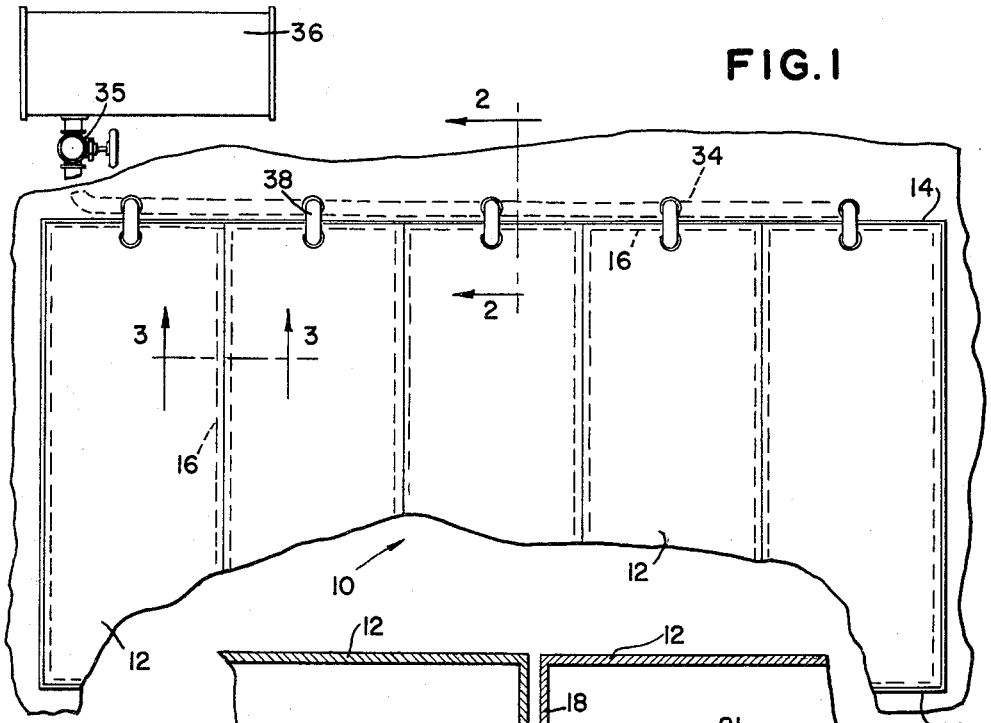
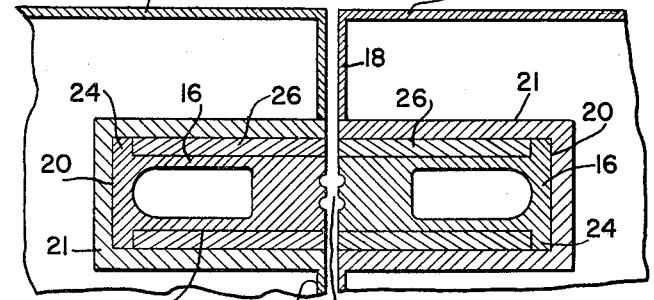
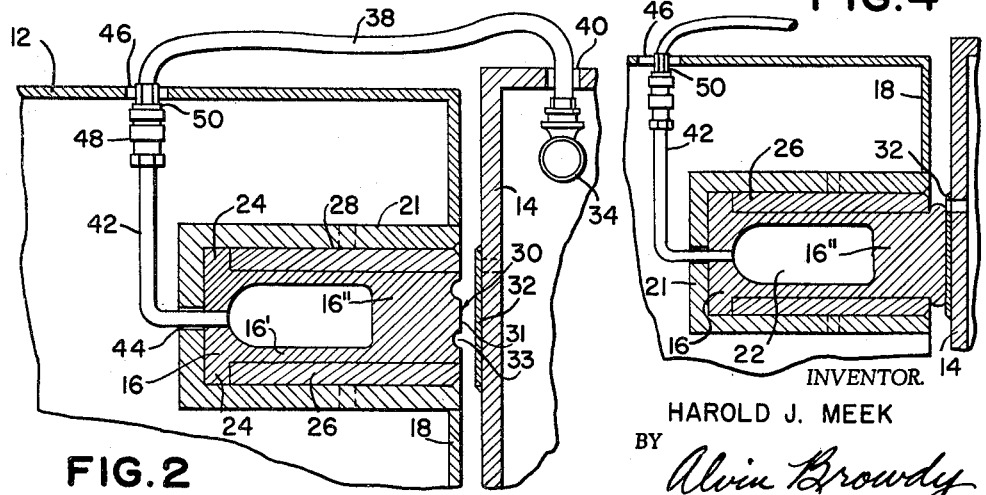
INVENTOR.
HAROLD J. MEEK
BY Alvin Browdy
ATTORNEY

United States Patent Office 3,171,381
Patented Mar. 2, 1965

3,171,381
HATCH COVER ASSEMBLY
Harold J. Meek, Ho-Ho-Kus, N.J., assignor to Jaroco International, Incorporated, Ho-Ho-Kus, N.J., a corporation of New Jersey
Filed Jan. 15, 1963, Ser. No. 251,519
7 Claims. (Cl. 114—201)

The present invention relates to sealing gaskets for hatch covers and, more particularly, to inflatable hatch cover seals.

Originally a ship's cargo hatch was covered by laying planks across the opening and lashing a tarpaulin over the planks to make the cover watertight. Not only is such a cover subject to leaking in rough weather, but on a large hatch considerable time and labor may be required to remove and replace this type of cover.

In order to overcome the above problems, several types of folding covers have been proposed and are now in use, generally consisting of hinged sections which may be hinged to the hatch coaming at one or both ends. These covers generally fold vertically at the side of the hatch and are opened and closed with the aid of the ship's hoisting gear. These folding covers, as well as the other types of hatch covers presently in use, are still subject to leakage in some instances, particularly around the section edges, and, in addition, require positive clamping mechanisms to maintain the covers in a sealed position.

It is an object of the present invention to provide a new and improved hatch cover assembly.

It is another object of the present invention to provide a hatch cover assembly including a novel inflatable gasket arrangement.

It is another object of the present invention to provide a hatch cover assembly which does not leak.

It is another object of the present invention to provide a hatch cover assembly which does not require positive clamping mechanisms to retain it in place over the hatch.

It is another object of the present invention to provide an improved inflatable gasket used in conjunction with a hatch cover, which effects simultaneous sealing of the hatch and anchoring of the hatch cover.

Other objects and the nature and advantages of the instant invention will be apparent from the following description taken in conjunction with the accompanying drawings, wherein FIG. 1 is a plan view of a hatch cover assembly;
FIG. 2 is a sectional view along the line 2—2 of FIG. 1;
FIG. 3 is a sectional view along the line 3—3 of FIG. 1; and
FIG. 4 is a view similar to FIG. 2 showing the gasket in inflated position.

FIG. 1 shows a hatch cover 10 composed of a plurality of hatch cover sections 12 surrounded on all sides by coaming 14. Shown in phantom in FIG. 1 and embedded about the periphery of each hatch cover section 12 is an inflatable gasket 16.

Each hatch cover 12 contains a vertical peripheral wall 18. A rectangular cavity 20 is provided in each peripheral wall 18 to receive the inflatable gasket 16. The cavity is formed by insertion of a channel shaped member 21 attached to the wall 18. Gasket 16 contains an inner hollow cavity 22 which is adapted to receive fluid under pressure to effect inflation. Gasket 16 is formed of any distendable material such as rubber or neoprene and is provided with a generally rectangular cross-section to cause linear expansion upon inflation to thereby obtain improved anchoring of the hatch cover 10.

In order to maintain the gasket 16 in place to insure its retention in the hatch cover section 12 and prevent its blowing out, the gasket 16 is provided at its inner surface with locking ribs 24; this provides somewhat of a T-shaped cross-section. Metal plates 26 are welded to channel members 21 as at 28 to effect interlocking with ribs 24.

Gasket 16 is also preferably provided with a tread section 30 to assist in providing functional engagement of the gasket against the coaming or against an adjacent gasket.

FIG. 2 shows a gasket 16 in uninflated condition in facing relationship with coaming 14. A plate 32 is welded to coaming 14 to provide a contact plate for engagement with the inflated gasket 16', as shown in FIG. 4. Tread section 30 and the pressure of the inflated gasket have been found effective in assisting the natural functional properties of the gasket material in retaining the hatch cover within the coaming over the hatch opening without the need of any other clamping mechanisms.

FIG. 3 shows two gaskets in facing relationship. As in FIG. 4, inflation of the gaskets effects a simultaneous sealing and gripping function between the two gaskets thereby sealing the two hatch cover sections to one another.

As shown in FIG. 2, the tread section 30 has a flat outer engaging face 31 with grooves 33 indented therefrom. The outer face 31 in the deflated condition shown in FIG. 2 is flush with the wall 18. The linear expansion referred to above during inflation results from the structure of the gasket 16. As shown, the side walls 16' of gasket 16 are comparatively thin as compared to the thicker outer face section 16" of gasket 16.

Inflation of the gaskets may be effected in a number of ways after the hatch cover has been placed over the hatch and adjacent the coaming. Each gasket may be inflated separately but preferably the gaskets are inflated simultaneously. This can be accomplished by an inflating device such as shown in FIGS. 1 and 2.

Along one section of the coaming, a fluid carrying pipe 34 is provided. This carrying pipe 34 is attached via valve 35 to a source of fluid pressure such as a pressurized gas tank 36. Along the length of pipe 34 individual flexible tubes 38 are provided for attachment to each gasket. These tubes 38 pass upwardly from pipe 34 through holes 40 in the top of coaming 14. Adjacent the area of each flexible tube 38, each gasket 14 is provided with an L-shaped inflation tube 42 which projects from the rear of gasket 16 through hole 44 in the channel 21. Inflation tube 42 projects upwardly to a hole 46 in the top wall of hatch cover section 12. Inflation tube 42 ends in a valve 48 and a coupling member 50 which allows the joining of a flexible tube 38 with its associated inflation tube 42.

Thus when the hatch cover 10 is placed over the open hatch within coaming 14, each flexible tube 38 is coupled with its associated inflation tube 48 and valve 35 is opened thereby effecting inflation of all the gaskets and causing simultaneous sealing of the hatch and anchoring of the hatch cover sections to each other and to the coaming.

An important feature of the hatch cover assembly of the present invention is the provision of an effective seal by the inflation of gaskets 16 with the simultaneous positive anchoring of the hatch cover within the coaming without the use of clamping mechanisms; this is due to the frictional engagement of the inflated gaskets against each other and against the coaming and their vertical face-to-face relationship which is normal to the plane of the hatch cover and coaming.

Another important feature of the present hatch cover assembly is the provision of means to retain the gasket within the cavity 20. By providing the channel 21 with a rectangular cross-section, not only will the gripping face 30 of gasket 16 provide improved anchoring, but interlocking elements 24 and 26 may be provided to retain the gasket within the cavity 20.

A further important feature of the present invention is that the gasket, when deflated, moves back into the cavity and is protected when the hatch cover is being removed and replaced.

It will be obvious to those skilled in the art that various changes may be made without departing from the spirit of the invention and therefore the invention is not limited to what is shown in the drawings and described in the specification, but only as indicated in the appended claims.

What is claimed is:

1. A hatch cover assembly comprising a multi-sectional hatch cover, a hatch coaming surrounding said hatch cover and lying within the plane of the body of said hatch cover, an inflatable gasket embedded in the peripheral walls of said hatch cover section in facing relationship with said coaming and in facing relationship with a gasket embedded in the peripheral wall of an adjacent hatch cover section, said facing relationship being normal to the plane of said hatch cover and coaming, said gasket being of one-piece construction, of substantially rectangular cross-section and having substantially flat engaging faces, said gaskets containing a hollow portion therein adapted to receive the inflation medium, said gaskets having relatively thin side walls adjacent said hollow portion and a relatively thick outer wall on the outer side of said hollow portion, said thick outer wall containing the flat engaging face on its outer surface, means to inflate said gaskets to effect linear expansion of said gaskets thus effecting contact with said coaming and with adjacent gaskets, said thick outer wall of said gaskets being of sufficient thickness that after linear expansion of said gaskets, a portion of said outer wall remains within the peripheral wall of said hatch cover section, and means at the rear of said gaskets to retain said gaskets in place to prevent their blowing out during expansion, whereby when said gaskets are inflated said gaskets are anchored against said coaming and against an adjacent gasket.

2. A hatch cover assembly in accordance with claim 1 wherein said substantially rectangular cross-section further comprises locking ribs, extending about the inner periphery of said gaskets to provide said gaskets with a T-shaped cross-section, said rectangular cross-section portion forming the center of the T and said locking ribs forming the top of the T, and wherein said means to retain said gaskets in place comprise plates which interlock with said locking ribs.

3. A hatch cover assembly comprising a horizontal hatch cover, a hatch coaming lying within the plane of said hatch cover and extending peripherally about said hatch cover, an inflatable gasket of one-piece construction having a generally rectangular cross-section embedded in the peripheral wall of said hatch cover, said gasket having a flat engaging surface in facing relationship with said coaming, said facing relationship being vertical, means to inflate said gasket to effect linear expansion of said gaskets thus effecting contact of said flat engaging surface with said coaming, means to retain said gasket in place to insure its retention in said hatch cover during inflation, and friction means on said gasket engaging surface to effect locking of said hatch cover to said coaming by frictionally anchoring said gasket against said coaming.

4. A hatch cover assembly in accordance with claim 3 wherein said hatch cover is composed of a plurality of sections and an inflatable gasket is provided for each section, whereby as said gaskets are inflated they engage said coaming on their outer edges and engage the adjacent gasket on their inner edges.

5. An inflatable gasket adapted to be embedded in a cavity provided in the peripheral walls of a hatch cover section, said gasket comprising a substantially rectangular cross section of one-piece construction, a substantially flat engaging face, a hollow portion therein adapted to receive an inflation medium, relatively thin side walls adjacent said hollow portion and a relatively thick outer wall on the outer side of said hollow portion, said thick outer wall containing the flat engaging face on its outer surface, whereby upon inflation of said hollow portion, a linear expansion occurs to effect outward linear movement of said flat engaging face with a portion of said thick outer wall remaining within the cavity in the peripheral wall of said hatch cover section.

6. An inflatable gasket in accordance with claim 5 wherein said substantially rectangular cross-section further comprises locking ribs, extending about the inner periphery of said gasket to provide said gasket with a T-shaped cross-section, said rectangular cross-section portion forming the center of the T and said locking ribs forming the top of the T.

7. An inflatable gasket in accordance with claim 5 wherein said gasket has friction means on the flat engaging face thereof, said friction means comprising a plurality of grooves extending inwardly from said flat engaging face.

References Cited in the file of this patent

UNITED STATES PATENTS 3,104,643 Vallet _____ Sept. 24, 1963

FOREIGN PATENTS 1,154,569 France _____ Nov. 4, 1957
1,055,988 Germany _____ Apr. 23, 1959